(12) United States Patent
Katoh et al.

(10) Patent No.: US 7,965,431 B2
(45) Date of Patent: Jun. 21, 2011

(54) OPTICAL DEFLECTING DEVICE

(75) Inventors: Seiichi Katoh, Miyagi (JP); Takeshi Nanjyo, Hyougo (JP)

(73) Assignee: Ricoh Company, Ltd., Tokyo (JP)

( * ) Notice: Subject to any disclaimer, the term of this patent is extended or adjusted under 35 U.S.C. 154(b) by 587 days.

(21) Appl. No.: 12/050,130

(22) Filed: Mar. 17, 2008

(65) Prior Publication Data
US 2008/0225367 A1 Sep. 18, 2008

(30) Foreign Application Priority Data

Mar. 15, 2007 (JP) ................. 2007-067241

(51) Int. Cl.
*G02B 26/08* (2006.01)
(52) U.S. Cl. ............... 359/199.2; 359/198.1; 359/200.6; 359/212.1; 359/214.1; 359/226.2
(58) Field of Classification Search ..... 359/196.1–226.2
See application file for complete search history.

(56) References Cited

U.S. PATENT DOCUMENTS

| 6,900,915 | B2 | 5/2005 | Nanjyo et al. |
| 7,064,878 | B2 | 6/2006 | Nanjyo et al. |
| 7,099,060 | B2 | 8/2006 | Nanjyo et al. |
| 7,215,452 | B2 | 5/2007 | Nanjyo et al. |
| 7,277,217 | B1 | 10/2007 | Katoh et al. |
| 7,333,256 | B2 | 2/2008 | Nanjyo et al. |
| 2007/0206268 | A1* | 9/2007 | Katoh et al. ............ 359/291 |
| 2008/0094680 | A1 | 4/2008 | Nanjyo et al. |

OTHER PUBLICATIONS

U.S. Appl. No. 12/014,570, filed Jan. 15, 2008, Nanjyo, et al.

* cited by examiner

*Primary Examiner* — James Phan
(74) *Attorney, Agent, or Firm* — Oblon, Spivak, McCelland, Maier & Neustadt, L.L.P.

(57) ABSTRACT

An optical deflecting device including a mirror member having a light reflective area. The optical deflecting device includes a plurality of electrodes that are formed on a substrate, a fulcrum member that functions as an electrode and a regulation member. The range of movement to a respect direction of the substrate is regulated by the regulation member, which includes a conductive material at least in the surface thereof.

3 Claims, 14 Drawing Sheets

US 7,965,431 B2

OPTICAL DEFLECTING DEVICE

CROSS-REFERENCE TO RELATED APPLICATIONS

The present application claims priority and contains subject matter related to Japanese Patent Application No. 2007-067241 filed in the Japanese Patent Office on Mar. 15, 2007, the entire contents of which are hereby incorporated herein by reference.

BACKGROUND OF THE INVENTION

1. Field of the Invention

The present invention relates to an optical deflecting device that changes a reflection direction of an incident light flux using a small mirror member, and a method for driving the optical deflecting device. Such a device may be used in an image forming apparatus, such as a printer, a copier, etc., and a projection-type image and video display apparatus, such as a projector, a digital theater system, etc.

2. Description of the Background Art

An optical deflecting device in which a plate-like member having a light reflective area not including a fixed end has been proposed, for example, in Japanese Patent Application Laid-open Publication No. 2004-078136 and No. 2006-133394. The plate-like member is slantingly placed on a fulcrum member provided on a substrate, and the plate-like member is rotated by applying potentials to electrodes arranged around the fulcrum member. A light flux incident to the light reflective area of the plate-like member is reflected with its reflection direction changed. Regulation members provided with cowl-like stoppers at respective uppers parts are arranged at corners of the substrate to regulate rotation of the plate-like member.

The optical deflecting proposed in Japanese Patent Application Laid-open Publication No. 2004-078136 and No. 2006-133394 are constructed such that a plate-like member having a light reflective area does not include a fixing member such as a hinge. Accordingly it is easy to make the optical deflecting device small and to drive it using a low voltage.

It is, however, difficult to switch the inclination direction of the plate-like member in the optical deflecting device. Thus, the operation of the device might become unstable.

SUMMARY OF THE INVENTION

Preferred embodiments of the present invention provide a novel optical deflecting device that addresses the above-mentioned problems.

According to an embodiment of the present invention, an optical deflecting device includes a mirror member having a light reflective area. The optical deflecting device further includes a plurality of electrodes formed on a substrate, and a fulcrum member having a function as an electrode which provides electrical current potential to the mirror member. The range of movement with respect to a direction of the substrate is regulated by a regulation member, which is conductive in at least a surface part thereof.

BRIEF DESCRIPTION OF THE DRAWINGS

A more complete appreciation and many of the attended advantages thereof will be readily obtained as the present invention becomes better understood by reference to the following detailed description when considered in connection with the accompanying drawings wherein.

DETAILED DESCRIPTION OF THE PREFERRED EMBODIMENTS

Figure 1A:
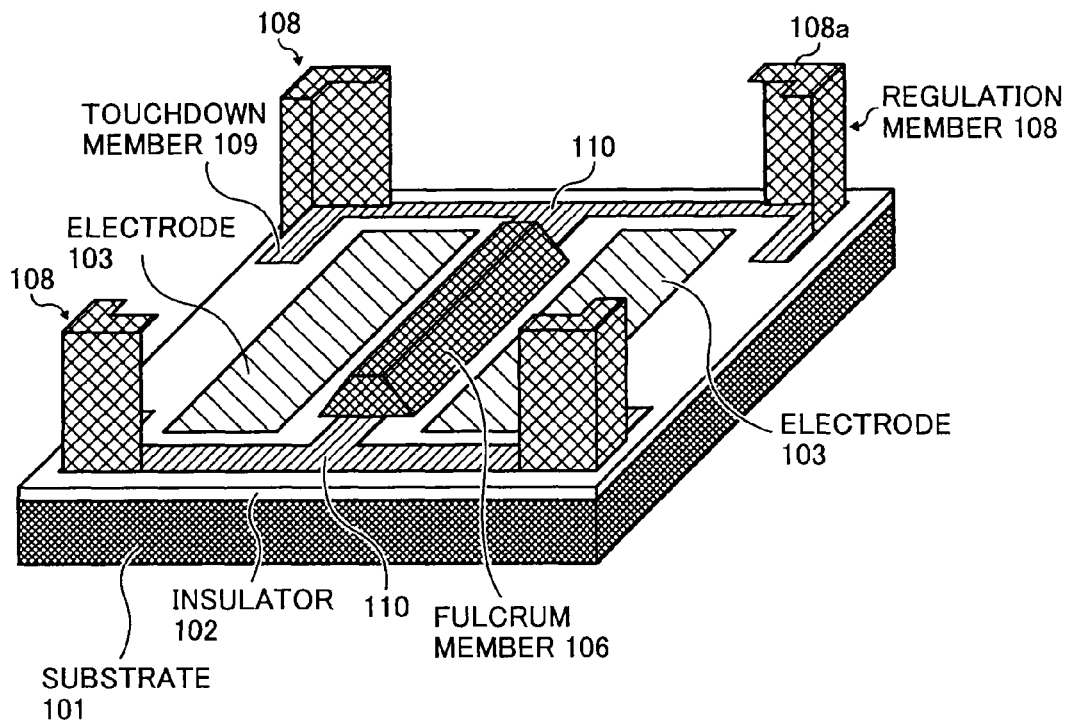
FIG. 1A is a diagram schematically illustrating an exemplary structure of an optical deflecting device according to an embodiment of the present invention without a plate-like member.

Referring now to the drawings, wherein like reference numerals designate identical or corresponding parts throughout the several views, preferred embodiments of the present invention are described.

Figure 1B:
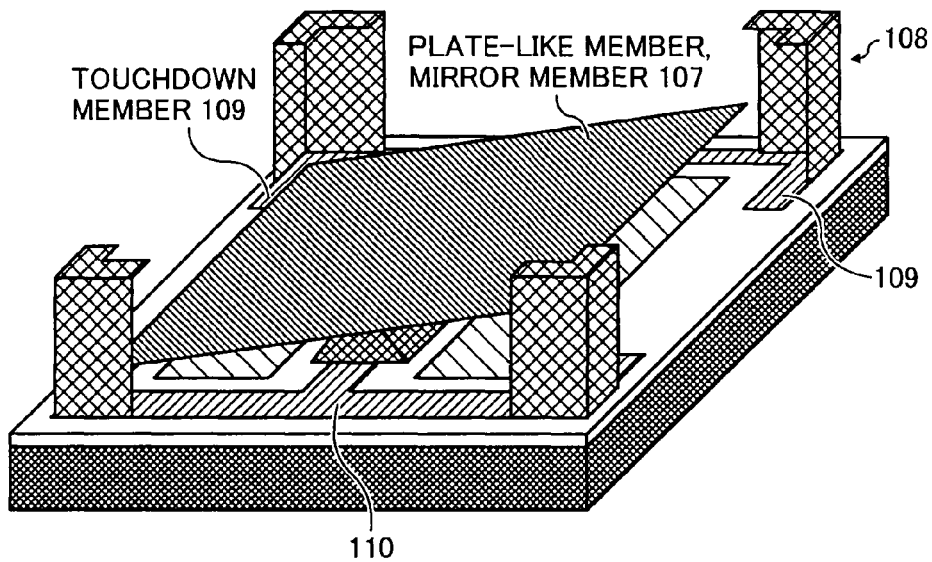
FIG. 1B is a diagram schematically illustrating an exemplary structure of an optical deflecting device according to an embodiment of the present invention including the plate-like member.

FIG. 1A and FIG. 1B are diagrams schematically illustrating an exemplary structure of an optical deflecting device according to an embodiment of the present invention.

FIG. 1A illustrates the optical deflecting device without a plate-like member, and FIG. 1B illustrates the optical deflecting device with the plate-like member. The optical deflecting device includes a substrate 101, an insulating film 102, a plurality of electrodes 103, a fulcrum member 106, a plate-like member 107, and a regulation member 108. The plate-like member 107 has a light reflective area formed on an upper surface thereof and a conductor layer formed at least on part of a backside thereof to oppose the electrodes 103.

The plate-like member 107 rests on the fulcrum member 106 as illustrated in FIG. 1B. As described in more detail below, the movement of the plate like member 107 around the fulcrum member 106 is regulated by the regulation member 108 so that the plate-like member 107 will not bounce on the substrate 101. More particularly, the regulation member 108 has an upper-stopper 108a at the top portion thereof to limit the movement of the plate-like member 107.

The inclination direction of the plate-like member 107 depends on electrostatic gravity that controls the plate-like member 107 via the electrodes 103.

The surface of the regulation member 108 and the touchdown member 109 are formed of a conductive material. The touchdown member 109 is in contact with the edge of the plate-like member 107 when the plate-like member 107 is slanted, and the regulation member 108 is electrically connected with touchdown member 109 and the fulcrum member 106.

Figure 2A:
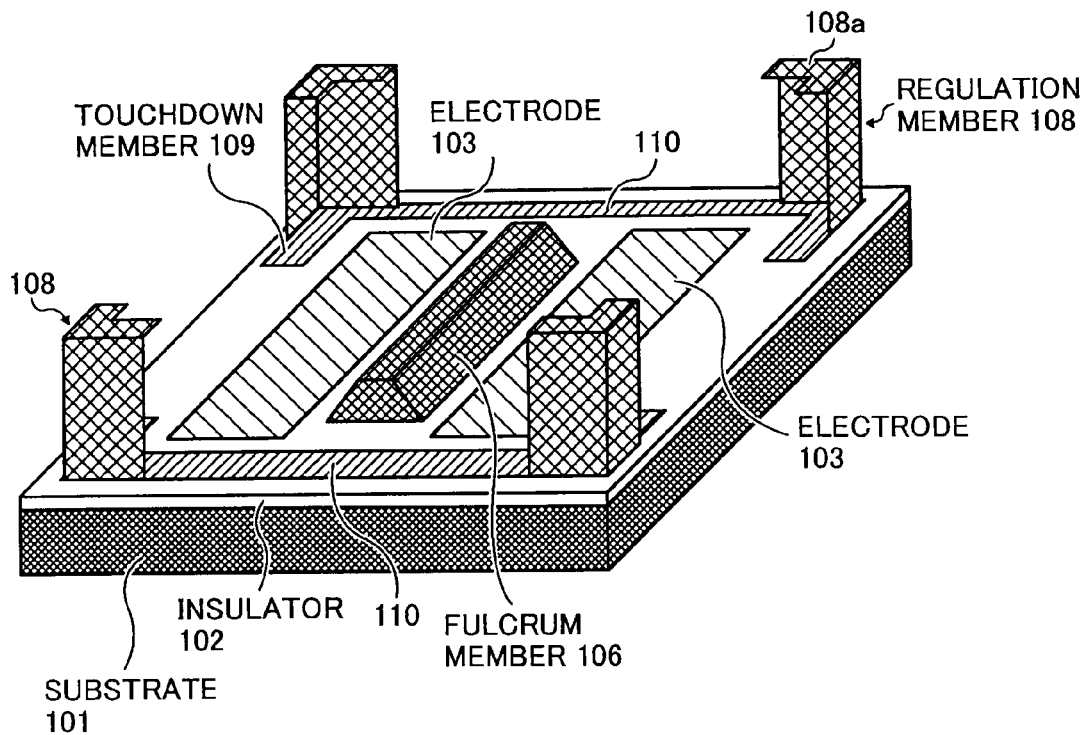
FIG. 2A is a diagram schematically illustrating an exemplary structure of an optical deflecting device according to an embodiment of the present invention without a plate-like member.
Figure 2B:
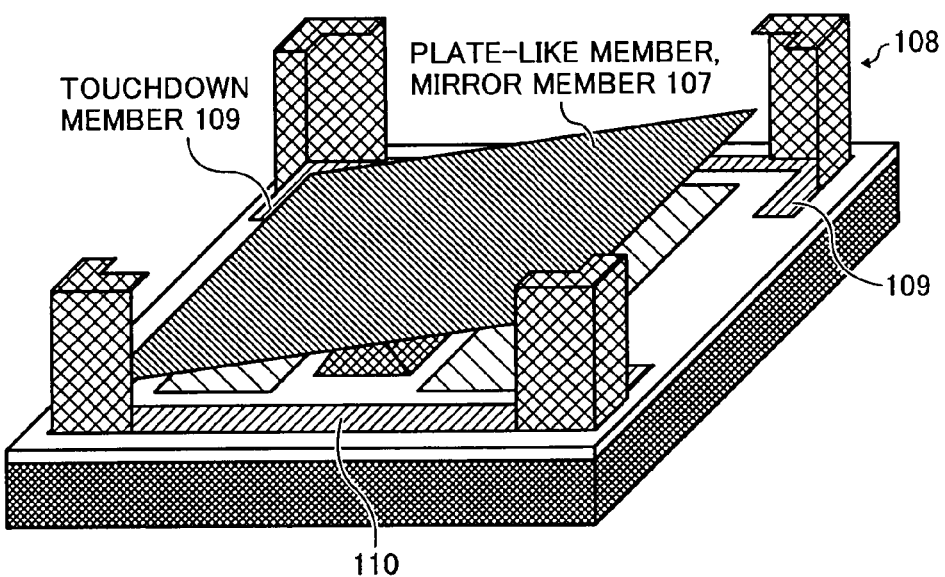
FIG. 2B is a diagram schematically illustrating an exemplary structure of an optical deflecting device according to an embodiment of the present invention including the plate-like member.

FIGS. 2A and 2B show another embodiment of the present invention. In this embodiment, the touchdown member 109 and the regulation member 108 are electrically connected by wiring material 110. However, the fulcrum member 106 is not electrically connected to either of the regulation member 108 or the touchdown member 109. Otherwise, the configuration is the same as the optical deflecting device shown in FIG. 1A and FIG. 1B.

Figure 3:
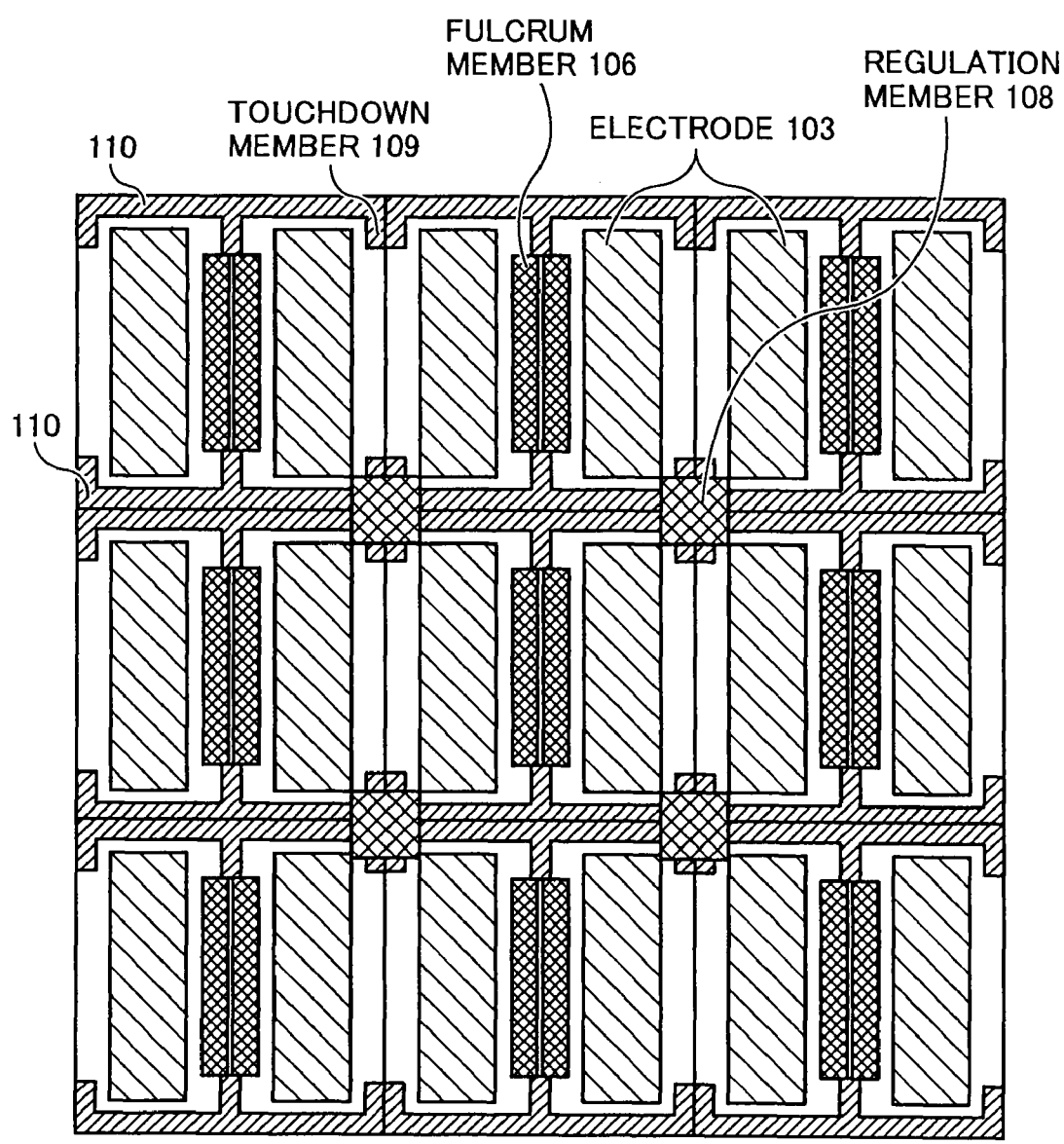
FIG. 3 is a schematic diagram illustrating an example of an optical deflecting device array in which a plurality of optical deflecting devices are two-dimensionally arranged.

FIG. 3 is a schematic diagram illustrating a example of an optical deflecting device array in which a plurality of the above-described optical deflecting devices (shown in FIG. 1A and FIG. 1B) are arranged in a two-dimensional array. The plate like member 107 is omitted from FIG. 3. The fulcrum member 106, the regulation member 108 and the touchdown member 109 are connected electrically in the devices of the array shown in FIG. 3. Thus, the potential of the plate-like member 107 of each optical deflecting device cannot be independently controlled.

Figure 4:
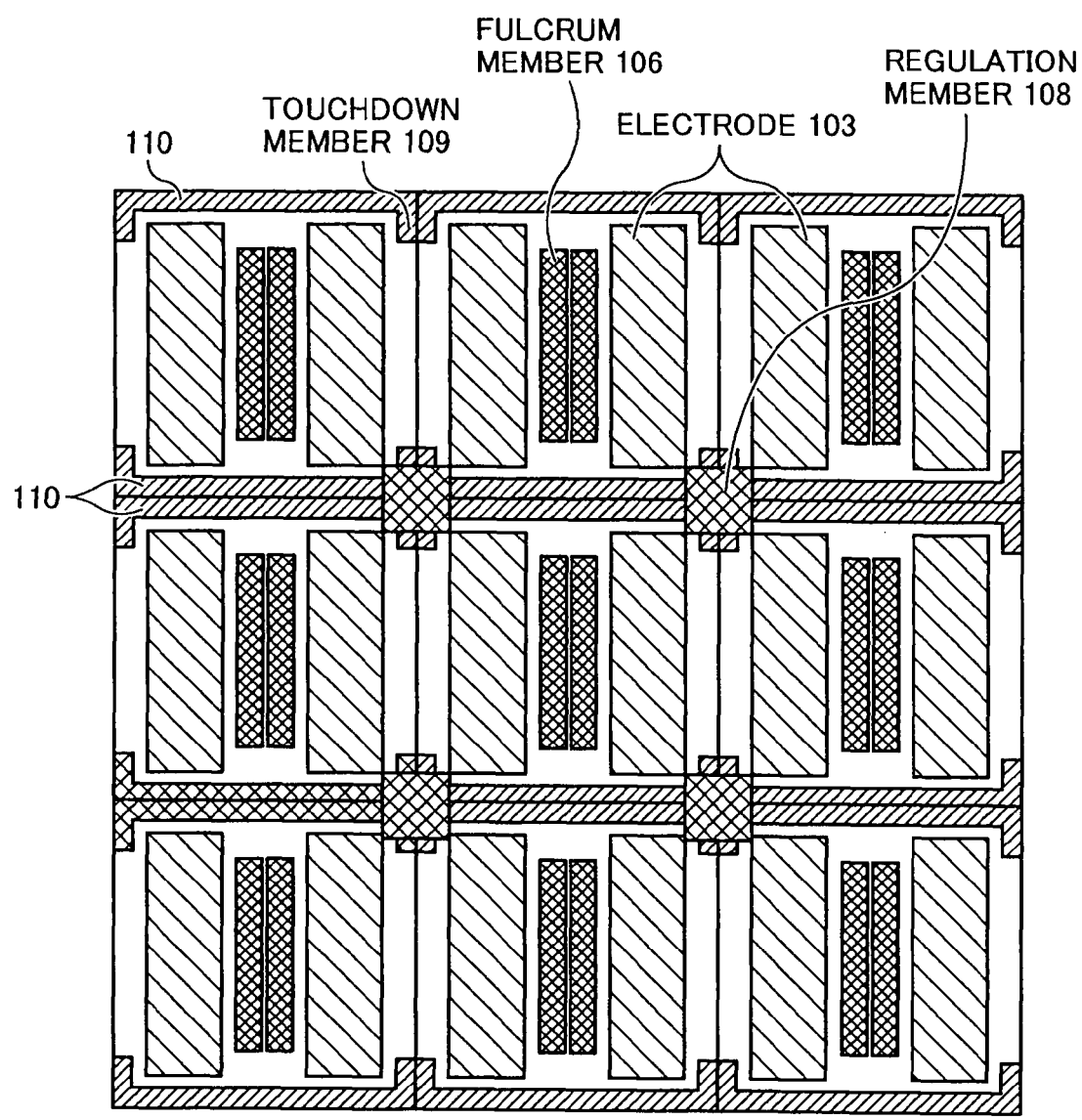
FIG. 4 is a schematic diagram illustrating an example of an optical deflecting device array in which a plurality of optical deflecting devices are two-dimensionally arranged.

FIG. 4 is a schematic diagram illustrating a example of an optical deflecting device array in which a plurality of the above-described optical deflecting devices shown in FIG. 2A and FIG. 2B are arranged in a two-dimensional array. The plate like member 107 is omitted.

The regulation member is formed with an insulator in an optical deflecting device and an optical deflecting device array indicated in Japanese Patent Application Laid-open Publication No. 2004-078136. Therefore, the plate-like member is electrically charged when the plate-like member inclines, and the regulation member rubs on the edge of the plate-like member.

Since the regulation member is an insulator, the static electricity that accumulates in the regulation member is not easily dissipated. As a result, the plate-like member attaches to the regulation member by electrostatic gravity between the regulation member and the plate-like member, and the inclination direction of the plate-like member is disturbed.

The present invention eliminates this problem because the surface part of the regulation member is at least a conductor in the optical deflecting device of the present invention, as shown in FIG. 1A and FIG. 2A. The regulation member 108 is connected to the touchdown member 109 and the fulcrum member 106 in plurality optical deflecting device electrically in the optical deflecting device array shown in FIG. 3 and FIG. 4. The static electricity of the regulation member 108 dissipates easily, and the static electricity is not accumulated easily in the regulation member 108. Therefore, electrostatic gravitation which disturbs the declination displacement movement of the regulation member 108 is not generated between the plate-like member 107 and the regulation member 108. As a result, it is possible for the regulation member 108 to move without such interference. In the optical deflecting device shown in FIG. 1A, steady movement is enabled because the plate-like member 107 and the regulation member 108 in electrical contact with the fulcrum member 106 maintain almost the same electric potential.

The regulation member 108, the touchdown member 109 and fulcrum member 106 are connected electrically in the optical deflecting device array shown in FIG. 3 or FIG. 4. Therefore, the static electricity of the regulation member 108 is easily dissipated.

In above-embodiment, the surface part of the regulation member 108 is at least a conductor. However, when a material whose efficiency is lower than the insulator is used as a material of the regulation member 108, the adverse effect caused by the friction electrification of the regulation member 108 can also be avoided.

Moreover, when anti-electrostatic material is spread on the surface of the regulation member 108, it is possible to lower the electric resistance of the regulation member 108 to avoid the above noted electrostatic effects.

More specifically, a level of resistance that can prevent electrification is described in non-patent document "Technology and Application of Anti-electrostatic Material" by Kiyoshi Akamatsu, p. 79. CMC Publishing Co., Ltd.

The above noted document describes that a surface resistance should be $1 \times 10^8 \sim 1 \times 10^{12} \Omega$, to control an effect against electrification. It is natural that the lower resistance is, the more the effect of the electrification prevention rises.

However, it is undesirable for the resistance of the regulation member 108 of the optical deflecting device array shown in FIG. 4 to be lowered too much. The resistance of the regulation member 108 should be assumed to be a high value within the range where electrification can be prevented. Therefore, if the method of the drive independently controlling the potential of the fulcrum member 106 adjoining the optical deflecting device is used for the optical deflecting device array, the potential of the plate-like member 107 adjoining the optical deflecting device is different. As a result, the current flows between each regulation member 108 adjoining the optical deflecting device. There is an inconvenience that the current value that flows between each regulation member 108 increases, when the resistance of the regulation member 108 is too low, as described below with reference to FIG. 5A.

Figure 5A:
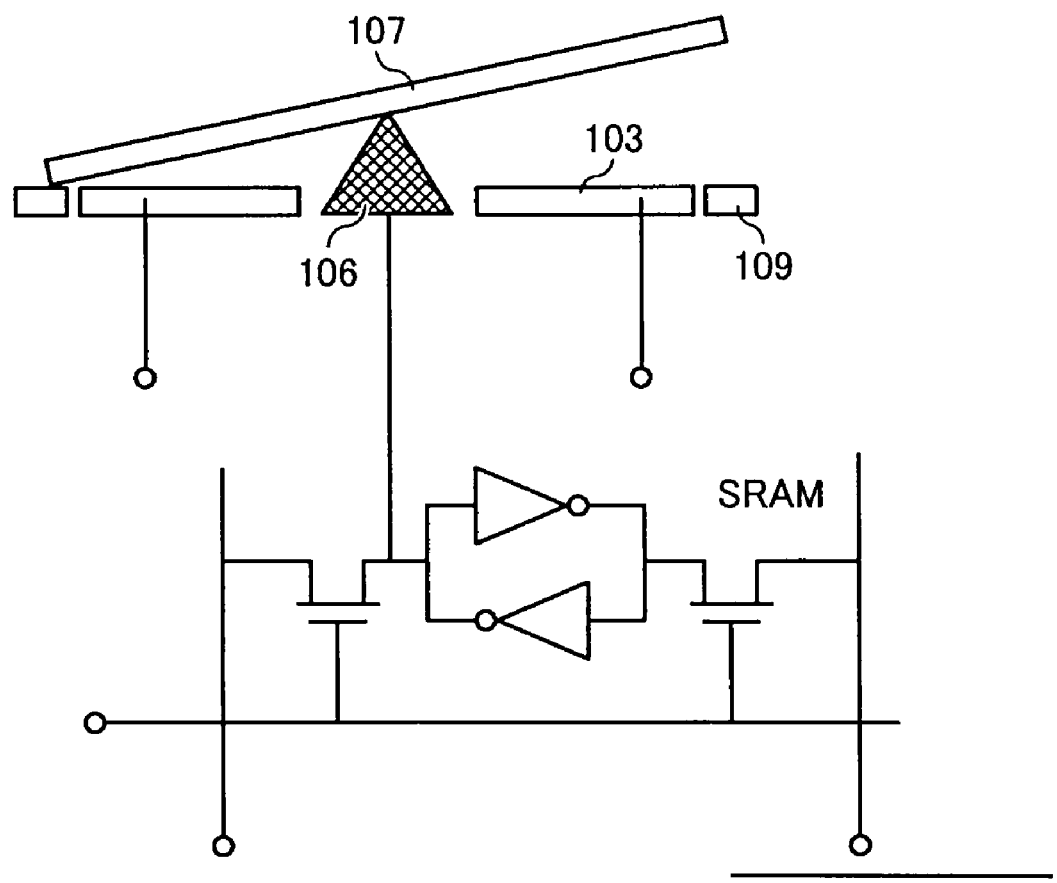
FIG. 5A is a schematic diagram illustrating an exemplary structure including a semiconductor memory arranged under the optical deflecting device.

For the optical deflecting device array shown in FIG. 4, the output of semiconductor memory (SRAM) built into the substrate of the each optical deflecting device shown in FIG. 5A is connected with the fulcrum member 106, and driving signals are written in SRAM. As a result, the potential of the fulcrum member 106 can be independently controlled.

The potential of the fulcrum member 106 is different for the method of this drive according to the optical deflecting device. Therefore, if the regulation member 108 is made to have conducting properties, the current flows from the fulcrum member 106 to the regulation member 108 via the plate-like member 107, and influences the operation of SRAM. If the current value is suppressed too low in SRAM, the influence on the operation does not become a problem.

The standby current of SRAM that composes the semiconductor memory is about 240μ/Mbit, and it is 240 pA by about 1 cell that composes 1 bit. Thus, there is no problem in the operation of semiconductor memory, if the standby current is 24 pA that flows to the touchdown member 109 or the regulation member 108.

Figure 5B:
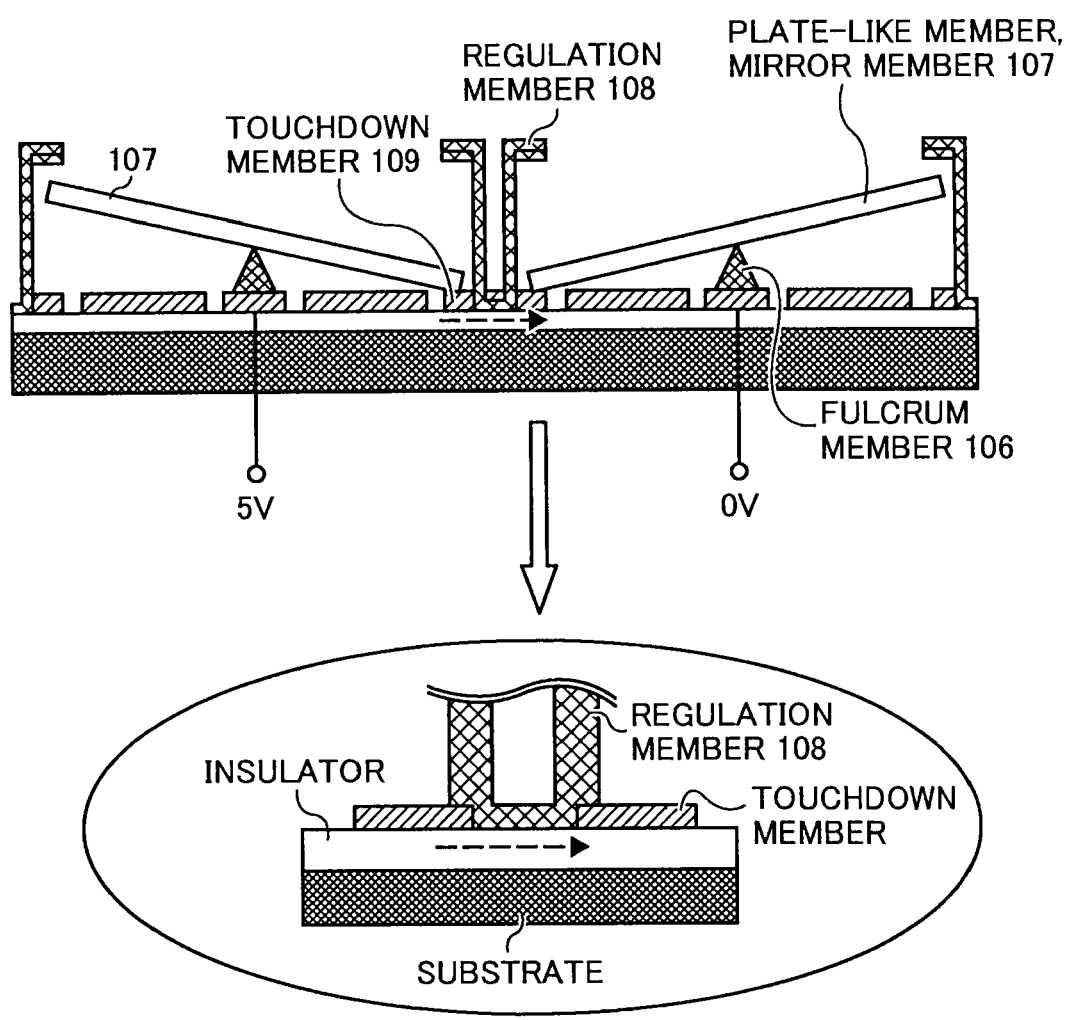
FIG. 5B is a schematic diagram illustrating an exemplary structure depicting the effect of a semiconductor memory arranged under the optical deflecting device.

It is different in the optical deflecting device that the direction of dip in the optical deflecting device adjoins. If the operation voltage of the semiconductor memory is 5 V, as shown in FIG. 5B, the resistance of the current route from the regulation member 108 to the touchdown member 109 is 210 GΩ. If the electrical resistivity is $1 \times 10^6$ Ωcm, the current becomes 24 pA. Under these conditions, the width of the part that the plate-like member 107 touches is 0.5 μm, length is 0.5 μm, and thickness is 0.1 μm.

Therefore, material which has resistivity of $2.1 \times 10^6 \Omega$ can be used for the optical deflecting device. The same material as the regulation member 108 can be used. In this case, surface resistance is $2.1 \times 10^{11}$ Ω/sq. This is a value in which electrification can be prevented.

A material that has small resistivity, like metal, can be used for the optical deflecting device. For example, the film of the above-material is formed to the regulation member 108, and the thickness of the film is moderately thinned to make it to appropriate resistance.

A material whose resistance is lower than the insulator can be used for the regulation member 108. For example, materials such as Hydroxide amorphous silicon oxide film, Hydrogenation silicon carbide and Hydrogenation silicon nitride film may be used for the regulation member 108. Such a silicon compound is used in the manufacturing process of semiconductor-fabrication device. If the optical deflecting device is produced on the semiconductor memory, it is easy to introduce.

The optical deflecting device and the optical deflecting device array are often used while exposed to light. If material like Hydrogenation amorphous silicon is used for the regulation member 108, the resistance of the regulation member 108 falls by exposing to light. As a result, electrification of the regulation member 108 can be prevented.

FIGS. 6A-6I depict a manufacturing process of the array shown in FIG. 3. Here, the plate-like member 107 is made with a surface area of around 10 μm. The inclination of the plate-like member 107 is 10 degrees. The height of the fulcrum member 106 is 0.87 μm, and the height of the regulation member 108 is 2.2 μm.

Figure 6A:
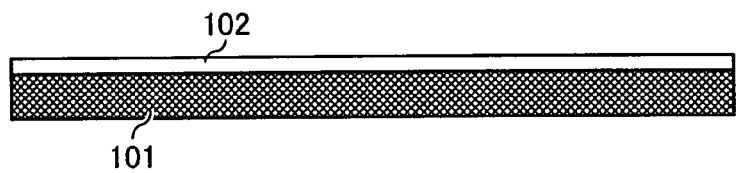
FIG. 6A, FIG. 6B, FIG. 6C, FIG. 6D, FIG. 6E, FIG. 6F, FIG. 6G, FIG. 6H and FIG. 6I illustrate steps in a production manufacturing process of the optical deflecting device array shown in FIG. 3.
Figure 6B:
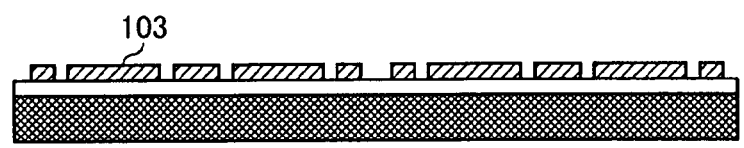
Figure 6B:
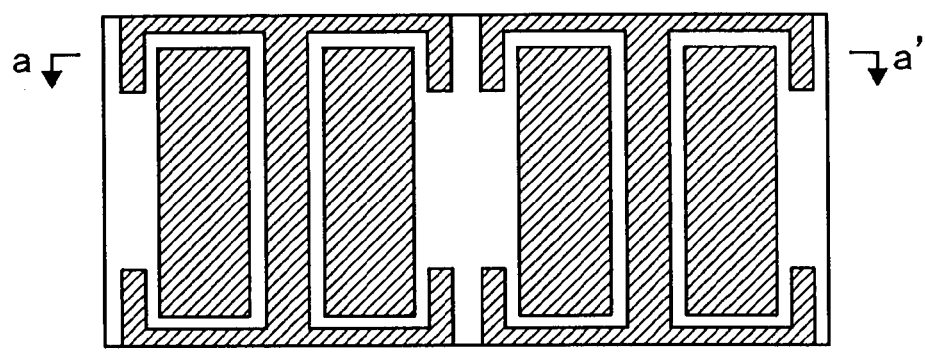

In FIG. 6A, the insulation film is formed on the substrate (Si). In FIG. 6B, the electrode 103, touchdown member 109, and wiring material 110 are formed on the insulation film by spatter. These are patterned by photography by using organic resist, thus forming the electrode 103, touchdown member 109 and wiring material 110 by etching in a reactive ion etching (RIE) process.

Figure 6C:
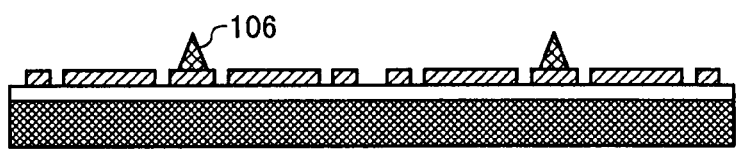
Figure 6C:
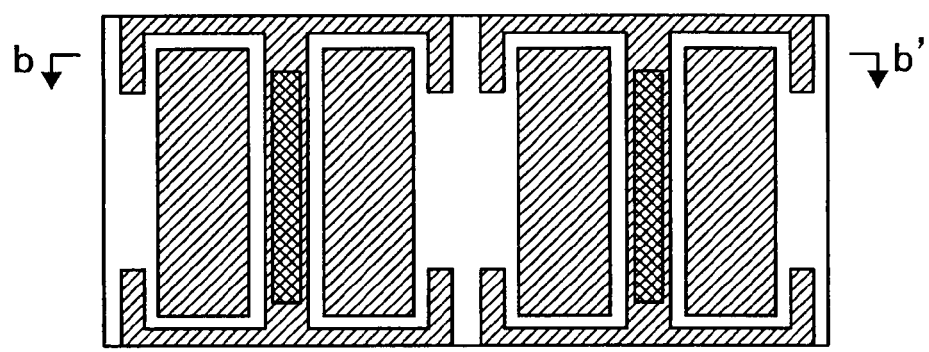

In FIG. 6C the protection insulation film is etched by photolithography and RIE. As a result, the protection insulation film is open on the outer surface. Furthermore, tungsten W is formed with a thickness of 1 μm. The fulcrum member 106 is formed having height of 0.87 μm with a photo mask, and is etched by RIE using the mixed gas of $SF_6$ and $O_2$.

Figure 6D:
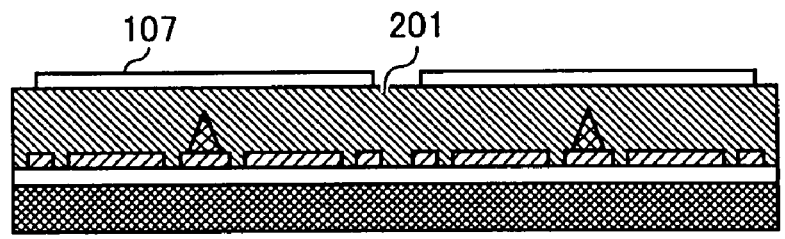
Figure 6E:
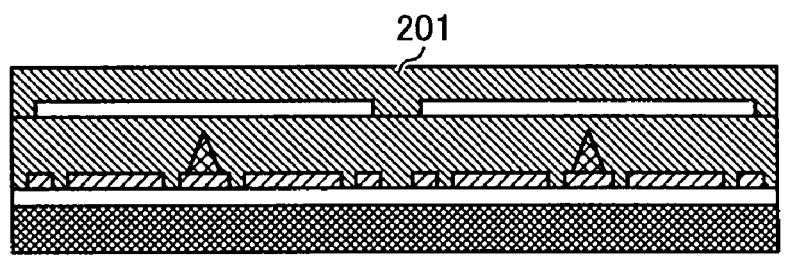

FIGS. 6D and 6E show an organic photo resist during which a sacrifice layer 201 is applied. For example, Al and Al—Ti alloy are formed with the film which is the thickness of 200 nm.

Figure 6F:
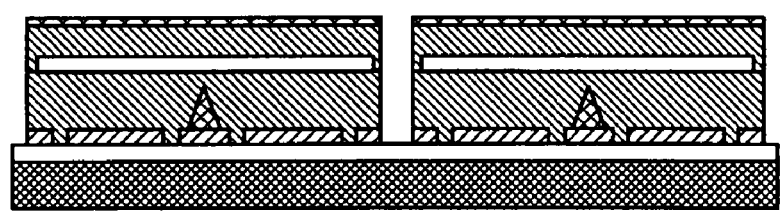

As depicted in FIG. 6F, a film of metal and a conductor is formed by spattering. The metal is Al or Al alloy, or a similar substance, and the conductor is indium tin oxide (ITO) or Zinc oxide or a similar substance. The organic photo resist is patterned by the method of photolithography. Al and Al alloy are etched by RIE using the mixed gas of $Cl_2$ and $BCl_3$. Indium tin oxide (ITO) is etched by a second ferric chloride solution. The Zinc oxides are etched by RIE using a mixed gas of $CF_4$ and Ar, and the photo resist is etched by RIE using $O_2$. For example, if an insulation film of silicon oxide film is made, the mother material of the regulation member 108 is formed of a material with a low resistivity. At first, it is formed by etching (e.g. spatter or deposition). Next, the silicon oxide film is formed by plasma chemical vapor deposition (CVD), and then the organic resist is formed. It is not easy to invade the hole which is the width of about 1 μm, because the organic resist has viscosity. The organic resist is patterned by photo resist, and the open mouth is formed.

Figure 6G:
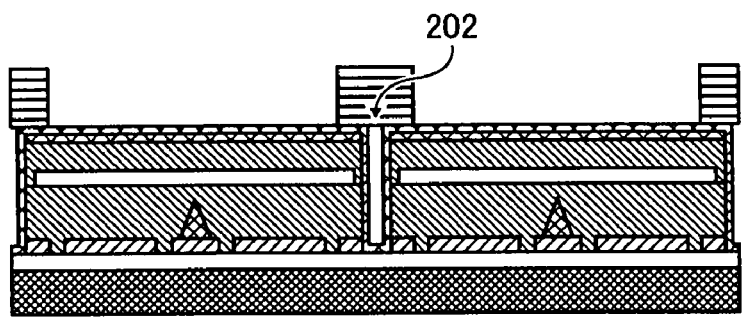

FIG. 6G shows that the film of silicon oxide that becomes the regulation member 108 is formed by the method of CVD. It is formed with a thickness of 300 nm. Or, after the microcrystal silicon is formed, the insulation film of the silicon oxide film can be formed. The film of the metal and the conductor is formed the thickness of 300 nm by of spatter. The metal is Al or Al alloy or a similar substance, and the conductor is ITO or Zinc oxides, or another similar substance. For example, when the insulation film of the silicon oxide film is made as the mother material of the regulation member 108, a material with low resistivity such as metal is formed as follows. First, a film of the metal is formed by spatter or deposition. Next, the film of the silicon oxide is formed by plasma CVD. The organic resist is spread. It is not easy to invade the hole which is the width of 1 mm, because the organic resist has viscosity. The organic resist is patterned by photolithography. As a result, it forms an open mouth 202.

Figure 6H:
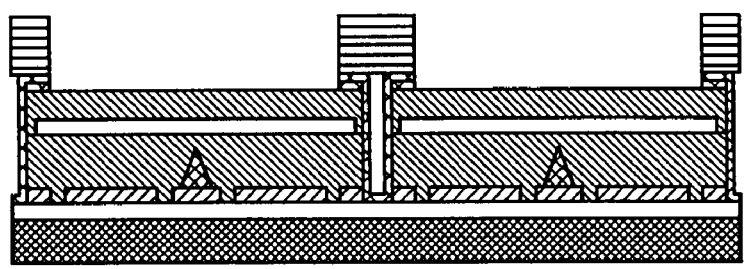

FIG. 6H shows that the Al or Al alloy is etched by RIE using mixed gas of $Cl_2$ and $BCl_3$. Moreover, ITO is etched using a ferric chloride solution. Zinc oxide is etched using mixed gas of $Cf_4$ and Ar. For example, an insulation film of the silicon oxide is made the mother material of the regulation member 108. When metal with a low resistivity is laminated on the regulation member 108, the organic resist is patterned by photolithography. The silicon oxide film is etched by RIE using the mixed gas of $CF_4$ and $H_2$. Finally, Al is etched by RIE using the mixed gas of $Cl_2$ and $BCl_3$.

Figure 6I:
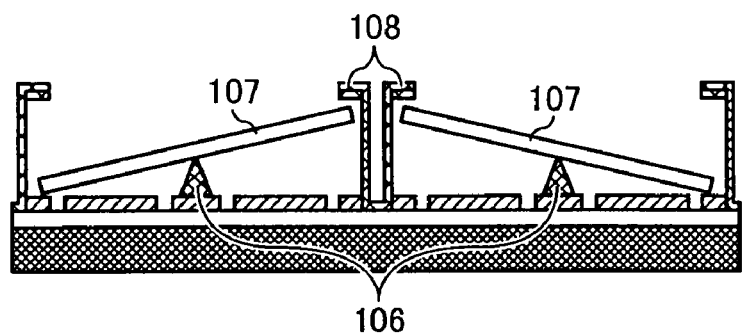

FIG. 6I shows that the sacrifice layer of the organic photoresist is isotopically etched by plasma of $O_2$. As a result, the sacrifice layer of the organic photoresist is removed.

The regulation member 108 can have conducting properties in using a transparent electrode such as ITO or zinc oxide. It is possible for the regulation member 108 to be made transparent. It is also possible to suppress a decrease in quantities of light to incident light or reflected light. Movement might be disturbed by the plate-like member 106 when touching the touchdown member 109 or the regulation member 108 when the plate-like member 106 is inclined. For example, water-repellent film is formed on the surface of the plate-like member 107. As a result, the surface energy of the plate-like member 107 lowers, and it is possible to prevent the plate-like member 107 from attaching to the touchdown member 109. The water-repellent film might be electrified. However, any charge can easily be dissipated because the plate-like member 107 is made to have conducting properties.

It is possible to prevent electrification by adding antistatic or carbon to the plate-like member 107. When only the regulation member 108 lowers resistance more than the insulator, it is more effective to prevent the electrification. Though the resistance of rubbing part is low, it is not easy to electrify.

Figure 7A:
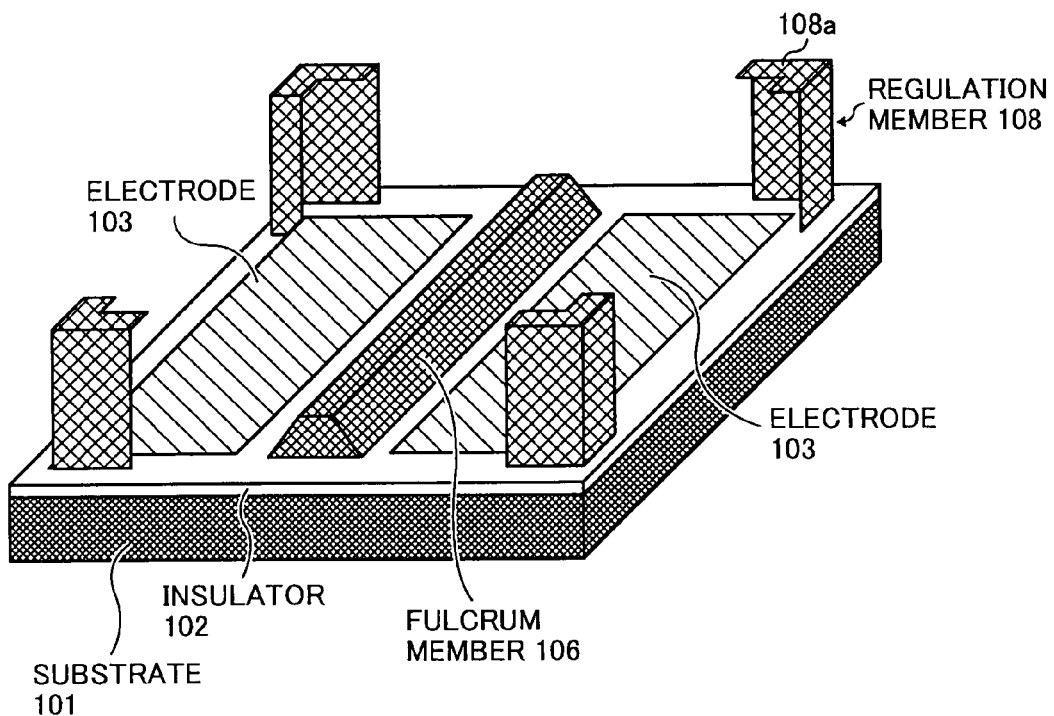
FIG. 7A is a diagram showing a variation of the optical deflecting device without a plate-like member.
Figure 7B:
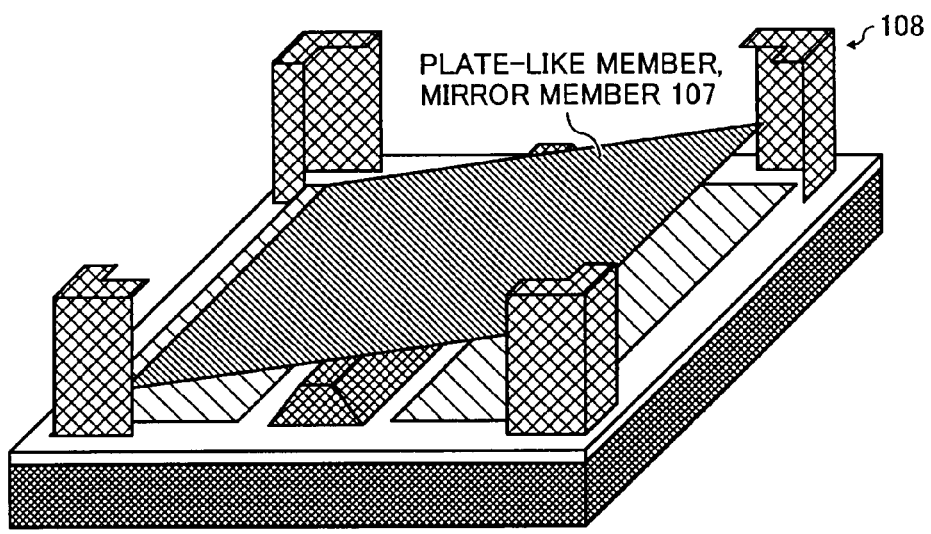
FIG. 7B is a diagram showing a variation of the optical deflecting device with a plate-like member.

FIG. 7A and FIG. 7B show one embodiment of the optical deflecting device which solves the electrification problem of the regulation member 108 by adding antistatic or carbon to the surface of each member in the optical deflecting device. The optical deflecting device of above-embodiment does not have the wiring conductor shown in FIG. 1A or FIG. 2A. Though there is not the touchdown member in above-embodiment, the embodiment may be modified to include a touchdown member. As for the optical deflecting device, a film of the antistatic or carbon is formed to the whole. The regulation member 108 is formed of material with lower resistance than insulator. Therefore, the regulation member 108 can release the charge by electrifying more effectively.

Next, a process of manufacture regarding a optical deflecting device array arranged according to FIG. 7A and FIG. 7B will be described. Here, the plate-like member 107 made to have a surface area of about 10 µm. The inclination of the plate-like member 107 is 10 degrees. The height of the fulcrum member 106 is 0.87 µm. The height of the regulation member 108 is 2.2 µm.

Figure 8A:
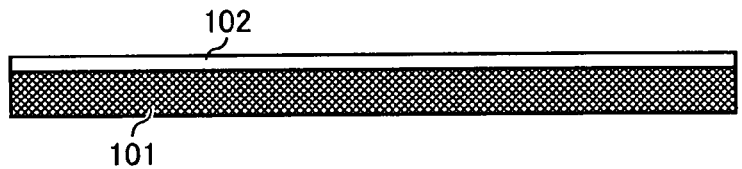
FIG. 8A, FIG. 8B, FIG. 8C, FIG. 8D, FIG. 8E, FIG. 8G, FIG. 8H and FIG. 8I illustrate steps in a manufacturing process of the optical deflecting device array shown in FIG. 7B.
Figure 8B:
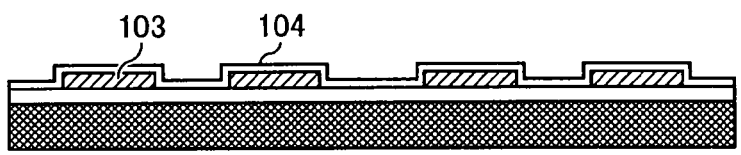
Figure 8B:
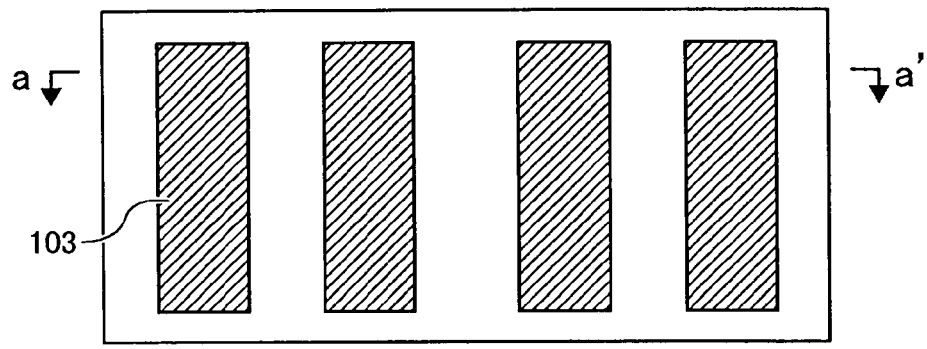

In FIG. 8A, the insulation film is formed on the substrate (Si). In FIG. 8B the Al film that becomes the electrode 103 is formed having a thickness of 200 nm on the insulation film by spatter, and these are patterned by photography using organic resist. The electrode is formed by etching using $Cl_2$ gas, and a silicon oxide film that becomes a protection insulation film is formed having a thickness of 200 nm by plasma CVD using mixed gas of $SiH_4$ and $N_2O$. The protection insulation film is etched by photolithography and RIE using mixed gas of $CF_4$ and $H_2$. As a result, the insulation film is formed with an open mouth.

Figure 8C:
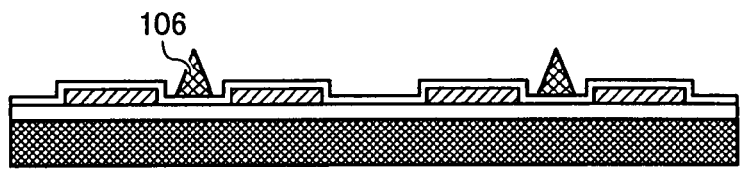
Figure 8C:
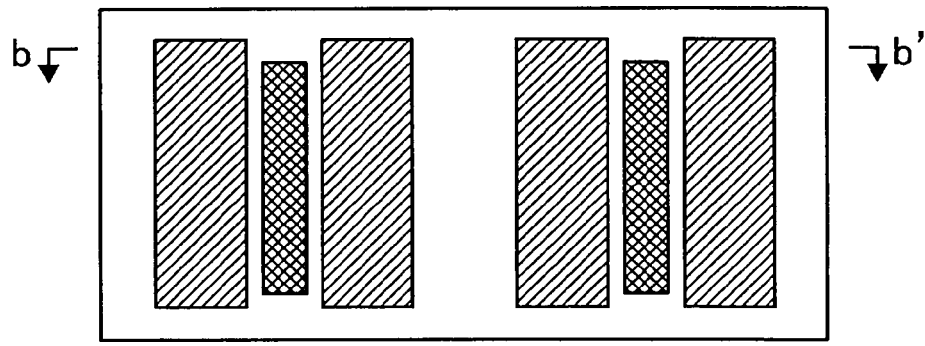

FIG. 8C shows that tungsten W is formed having a thickness of 1 µm. The fulcrum member 106 is formed having a height of 0.87 µm with a photomask. It is etched by RIE using the mixed gas of $SF_6$ and $O_2$.

Figure 8D:
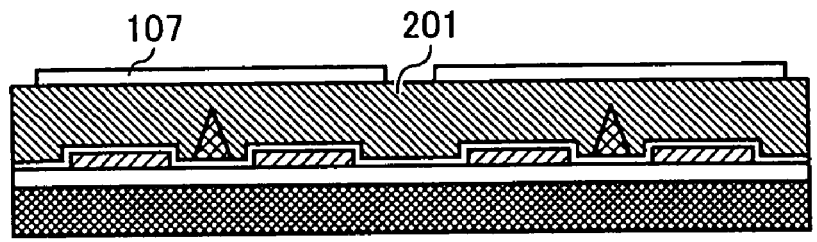
Figure 8E:
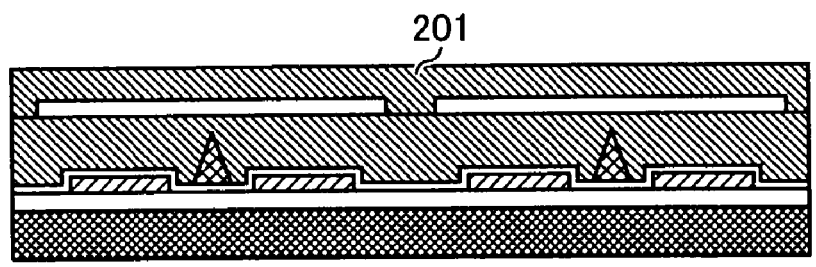

In FIG. 8D an organic photo resist used as a sacrifice layer is applied. For example, Al and Al—Ti alloy are formed having a thickness of 200 nm. Then, as depicted in FIG. 8E an organic photo resist is used to apply a subsequent sacrifice layer.

Figure 8F:
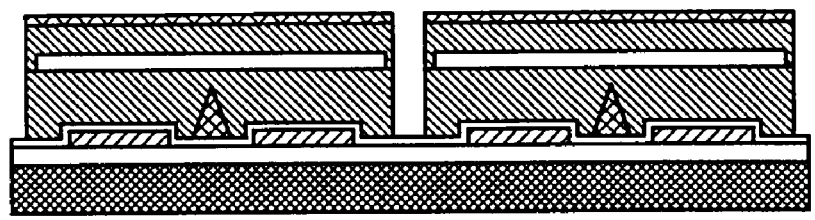

In FIG. 8F, the silicon oxide film, which is part of the regulation member, is formed by plasma CVD, and is a film that becomes an etching mask in the sacrifice layer. Or, after the microcrystal silicon is formed, the insulation film of the silicon oxide film can be formed. As a result, the microcrystal silicon can be formed on the silicon oxide film of the regulation member. The formation speed is slow, though the microcrystal silicon is electroconductive. Therefore, the mother material of the regulation member can be made of silicon oxide film. The organic resist is patterned by photolithography. The photo resist is etched by RIE using $O_2$. For example, the insulation film of the silicon oxide is used as the mother material of the regulation member 108, and when a metal with a low resistivity is laminated on the regulation member 108, the organic resist is patterned by the method of photolithography. The silicon oxide film is etched by RIE using the mixed gas of $CF_4$ and $H_2$. Finally, Al is etched by RIE using the mixed gas of $Cl_2$ and $BCl_3$.

Figure 8G:
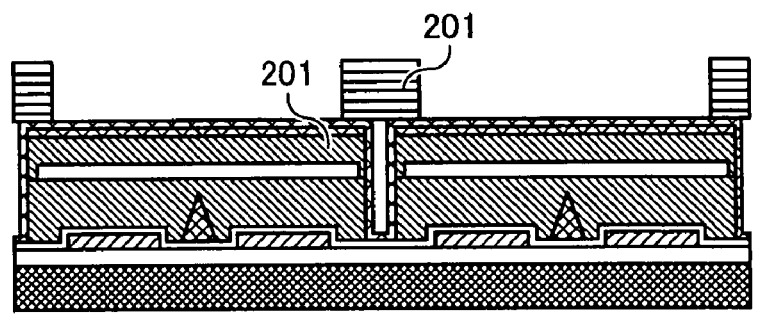

In FIG. 8G the film of silicon oxide that becomes the regulation member 108 is formed by CVD, at a thickness of 300 nm. Or, after the microcrystal silicon is formed, the insulation film of the silicon oxide film can be formed. The film of the metal and the conductor is formed having a thickness of 300 nm by spatter. The metal may be Al or Al alloy, or any other suitable material, and the conductor may be ITO or Zinc oxide, or another suitable material. For example, when the insulation film of the silicon oxide film is made as the mother material of the regulation member 108, the material with low resistivity such as metal is formed. It forms as follows. First, the film of the metal is formed by spatter or deposition. Next, the film of the silicon oxide is formed by plasma CVD, and the organic resist is spread. It is not easy to invade the hole having a width of 1 mm, because the organic resist has viscosity. The organic resist is patterned by photolithography. As a result, it forms open mouth 202.

Figure 8H:
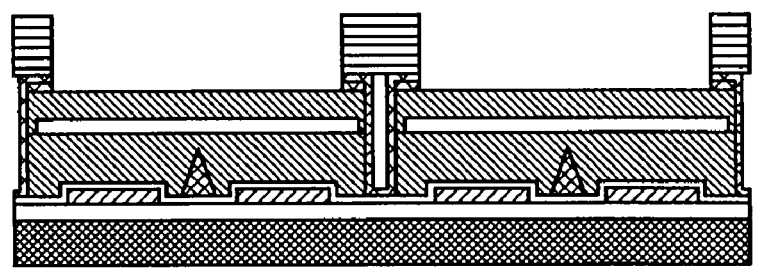

In FIG. 8H, the film of the hydrogenation oxide or the silicon oxide is etched by RIE using the mixed gas of $CF_4$ and $H_2$, as follows. If the film is Al or Al alloy, it is formed by etching used the mixed gas of $CL_2$ and $BCl_3$. Or, if the film is ITO, it is etched by the second chloridization iron solution. Zinc oxide is etched by RIE using the mixed gas of $CF_4$ and Ar. For example, the insulation film of the silicon oxide is used as the mother material of the regulation member 108, and when metal with a low resistivity is laminated on the regulation member 108, the organic resist is patterned by photolithography. The silicon oxide film is etched by the method of RIE using the mixed gas of $CF_4$ and $H_2$. Finally, Al is etched by RIE using the mixed gas of $Cl_2$ and $BCl_3$.

Figure 8I:
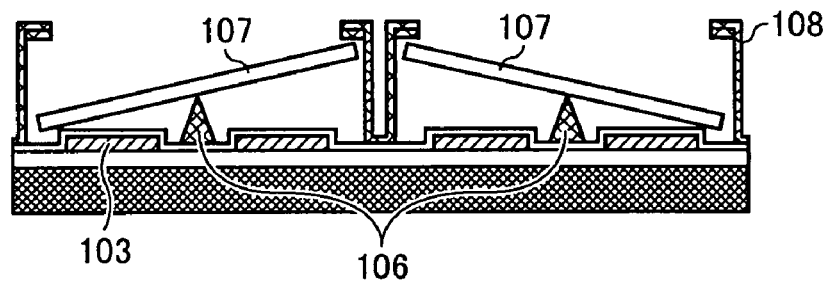

In FIG. 8I, the sacrifice layer of the organic photoresist is isotopically etched by plasma of $O_2$. As a result, the sacrifice layer of the organic photoresist is removed, and the carbon is completely formed by vacuum deposition. Or, the antistatic is completely sprayed by the method of mist by an ultrasonic nozzle. For example, the antistatic is $HOOCCH_2(C_2H_4O)$ $nCH_2COOH$. It is desirable not to include Na or Li, if a MOS device is used to control the optical deflecting device. The image projection device shown in FIG. 9 is one of the application examples.

Figure 9:
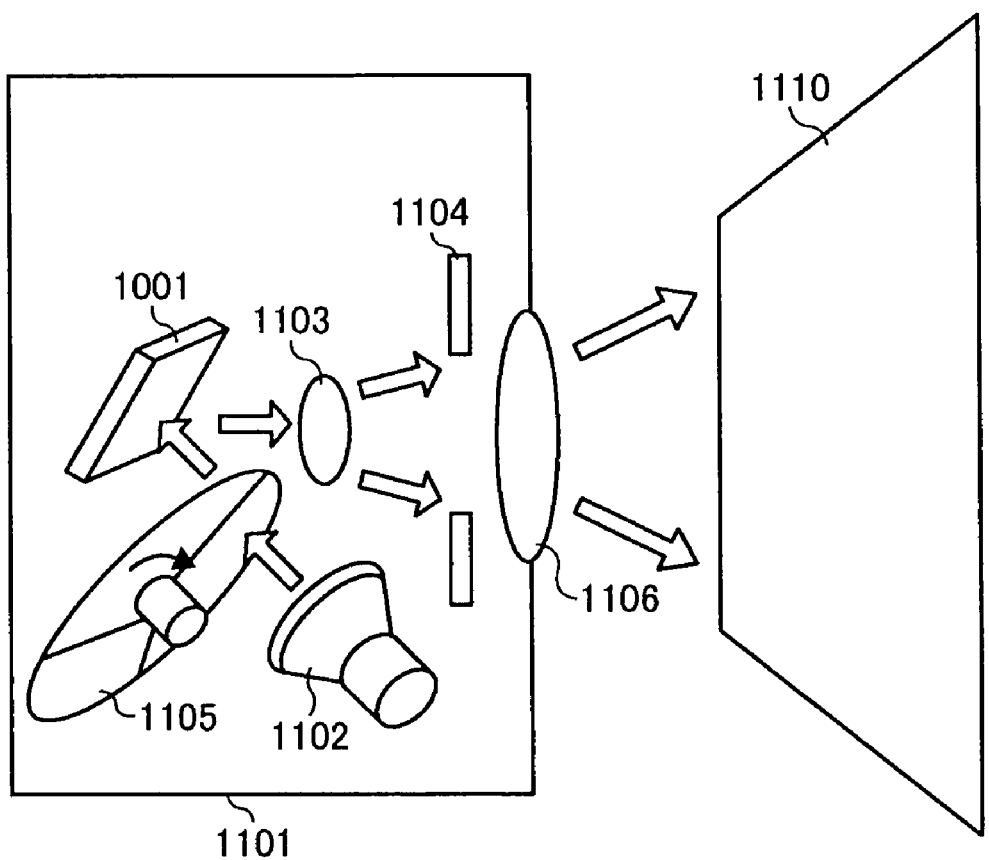
FIG. 9 is a diagram illustrating an exemplary structure of an image projection display apparatus using the optical deflecting device.

FIG. 9 illustrates an embodiment of an image projection display apparatus using the optical deflecting device and its drive method of the present invention. A light having a certain diverting angle from a light source 1102 is illuminated onto an optical deflecting device 1101 of the present invention via a rotating color filter 1105. Light is reflected from a light reflective area of a plate-like member of the optical deflecting device 1101 via a projection lens 1106 in the first inclination direction of the plate-like member, which is the ON state. However, in the second inclination direction of the plate-like member, the reflected light impinges upon a light shielding member 1104 as a diaphragm and is not illuminated onto the projection screen 1110, which is the OFF state. By arranging a plurality of the optical deflecting devices 1101, the optical deflecting device 1101 can be used as a light switch device of a display apparatus displaying image projection data (i.e., displaying light and shade of a pixel). Accordingly, the control of light and shade of a pixel (i.e., the ON/OFF control of light switching) is excellent, the stray light (the reflected light from a neighboring element generated when the reflection direction has been disturbed) can be suppressed, high-speed operation is possible, long-term reliability is high, driving with a low voltage is possible, and the contrast ratio can be enhanced.

Numerous additional modifications and variations of the present invention are possible in light of the above-teachings. It is therefore to be understood that within the scope of the claims, the present invention can be practiced otherwise than as specifically described herein.

What is claimed is:

1. An optical deflecting device, comprising:
    a substrate;
    a fulcrum member formed on the substrate;
    a plate member configured to rest on the fulcrum, the plate member including a reflective upper surface and a conductive lower surface;
    a plurality of electrodes formed on the substrate and configured to control an inclination of the plate member with respect to the fulcrum member by applying electric potential to the conductive lower surface of the plate member;
    a plurality of regulation members formed on the substrate and configured to regulate the range of movement of the plate member, wherein at least a portion of the surfaces of each of the plurality of regulation members are conductive; and
    a touchdown member formed on the substrate and configured to make contact with the plate member,
    wherein the plurality of regulation members, the touchdown member and the fulcrum member are configured to be electrically connected.

2. An optical deflecting device, comprising:
a substrate;
a fulcrum member formed on the substrate;
a plate member configured to rest on the fulcrum, the plate member including a reflective upper surface and a conductive lower surface;
a plurality of electrodes formed on the substrate and configured to control an inclination of the plate member with respect to the fulcrum member by applying electric potential to the conductive lower surface of the plate member;
a plurality of regulation members formed on the substrate and configured to regulate the range of movement of the plate member, wherein at least a portion of the surfaces of each of the plurality of regulation members are conductive; and
a touchdown member formed on the substrate and configured to make contact with the plate member,
wherein the plurality of regulation members and the touchdown member are configured to be electrically connected.

3. An optical deflecting device as claimed in claim 1, comprising:
a substrate;
a fulcrum member formed on the substrate;
a plate member configured to rest on the fulcrum, the plate member including a reflective upper surface and a conductive lower surface;
a plurality of electrodes formed on the substrate and configured to control an inclination of the plate member with respect to the fulcrum member by applying electric potential to the conductive lower surface of the plate member; and
a plurality of regulation members formed on the substrate and configured to regulate the range of movement of the plate member, wherein at least a portion of the surfaces of each of the plurality of regulation members are conductive,
wherein a carbon membrane is formed on the surface of each of the substrate, the fulcrum member, the plate member and each of the plurality of regulation members.

* * * * *